United States Patent
Scott-Collins et al.

(10) Patent No.: US 12,427,922 B2
(45) Date of Patent: Sep. 30, 2025

(54) BASE ASSEMBLY, REAR VIEW DEVICE CARRYING A CAMERA, VEHICLE AND ASSEMBLING METHOD

(71) Applicant: MOTHERSON INNOVATIONS COMPANY LIMITED, London (GB)

(72) Inventors: Callum Scott-Collins, Portchester (GB); Steve Horne, Portchester (GB)

(73) Assignee: Motherson Innovations Company Limited, London (GB)

( * ) Notice: Subject to any disclaimer, the term of this patent is extended or adjusted under 35 U.S.C. 154(b) by 123 days.

(21) Appl. No.: 18/179,509

(22) Filed: Mar. 7, 2023

(65) Prior Publication Data
US 2023/0302998 A1    Sep. 28, 2023

(30) Foreign Application Priority Data
Mar. 23, 2022    (DE) .................... 10 2022 106 903.6

(51) Int. Cl.
*B60R 1/12* (2006.01)
*B60R 1/06* (2006.01)
(Continued)

(52) U.S. Cl.
CPC .................. *B60R 1/12* (2013.01); *B60R 1/06* (2013.01); *B60R 1/25* (2022.01); *B60R 1/26* (2022.01);
(Continued)

(58) Field of Classification Search
CPC ........ H04N 23/50; H04N 23/51; H04N 23/54; H04N 23/57; B60R 1/12; B60R 1/06; B60R 1/25; B60R 1/26; B60R 11/04; B60R 2001/1223; B60R 2001/1253; B60R 2011/004; G03B 17/02; G03B 17/566; G03B 30/00; G03B 2217/00; G03B 2217/002; F16M 11/00; F16M 11/02;
(Continued)

(56) References Cited

U.S. PATENT DOCUMENTS 9,229,299 B1 *    1/2016  Morlon .................. F16M 13/04
2003/0026009 A1 * 2/2003  Vandenbrink .......... B60R 1/078
                                                         359/877
(Continued)

FOREIGN PATENT DOCUMENTS

CN    206341302            7/2017
CN    206341302 U  *    7/2017    ............. B60R 11/04
(Continued)

OTHER PUBLICATIONS

UK Intellectual Property Office, Appl. GB2303440.8, Examination Report, Sep. 8, 2023.
(Continued)

*Primary Examiner* — Twyler L Haskins
*Assistant Examiner* — Akshay Trehan
(74) *Attorney, Agent, or Firm* — Jones Day

(57) ABSTRACT

The present disclosure refers to a base assembly of an exterior rear view device to be mounted to a vehicle, comprising a base frame and at least one camera sub-assembly attached to the base frame, wherein the camera sub-assembly comprises at least one camera, a camera cradle and a camera holder designed to provide clamping force and datum onto the camera.

29 Claims, 2 Drawing Sheets

(51) Int. Cl.
  *B60R 1/25* (2022.01)
  *B60R 1/26* (2022.01)
  *B60R 11/04* (2006.01)
  *G03B 17/56* (2021.01)
  *G03B 30/00* (2021.01)
  *H04N 23/51* (2023.01)
  *H04N 23/54* (2023.01)
  *H04N 23/57* (2023.01)

(52) U.S. Cl.
  CPC ............. *B60R 11/04* (2013.01); *H04N 23/51* (2023.01); *H04N 23/54* (2023.01); *H04N 23/57* (2023.01); *B60R 2001/1223* (2013.01); *B60R 2001/1253* (2013.01); *G03B 17/566* (2013.01); *G03B 30/00* (2021.01)

(58) Field of Classification Search
  CPC ...... F16M 11/04; F16M 11/041; F16M 13/00; F16M 13/005; F16M 13/02; F16M 13/022; F16M 2200/00; F16M 2200/02; F16M 2200/08
  See application file for complete search history.

(56) References Cited

U.S. PATENT DOCUMENTS

| | | | | |
|---|---|---|---|---|
| 2009/0268013 | A1* | 10/2009 | Katahira | G03B 35/08 348/46 |
| 2010/0060747 | A1* | 3/2010 | Woodman | H04N 23/51 348/222.1 |
| 2015/0008300 | A1* | 1/2015 | Jagoda | B60R 11/04 248/309.1 |
| 2015/0195435 | A1* | 7/2015 | Oshida | H04N 23/54 348/373 |
| 2016/0189391 | A1* | 6/2016 | Demartin | G01S 5/0072 382/103 |
| 2017/0253184 | A1* | 9/2017 | Nishimoto | B60R 1/06 |
| 2017/0257535 | A1* | 9/2017 | Minikey, Jr. | H04N 23/54 |
| 2019/0339593 | A1* | 11/2019 | Mayville | G03B 17/561 |
| 2020/0298762 | A1* | 9/2020 | Ichimura | B60R 1/12 |
| 2021/0094474 | A1* | 4/2021 | Vetter | B60S 1/528 |
| 2022/0176880 | A1* | 6/2022 | Lettis | H04N 23/50 |
| 2022/0191369 | A1* | 6/2022 | Ito | B60R 1/06 |

FOREIGN PATENT DOCUMENTS

| | | | |
|---|---|---|---|
| CN | 109311427 A | 2/2019 | |
| CN | 112977277 | 6/2021 | |
| CN | 112977277 A * | 6/2021 | ............... B60R 1/00 |
| EP | 2809550 | 3/2018 | |

OTHER PUBLICATIONS

German IP, Appl. 10 2022 106 903.6, Office Action, Dec. 5, 2022.
CNIPA, Appl. 202310293502.7, First Office Action, Aug. 2, 2025.

* cited by examiner

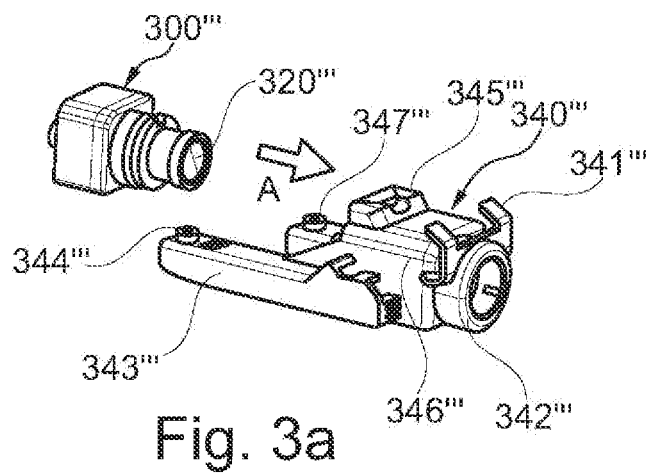
Fig. 3a
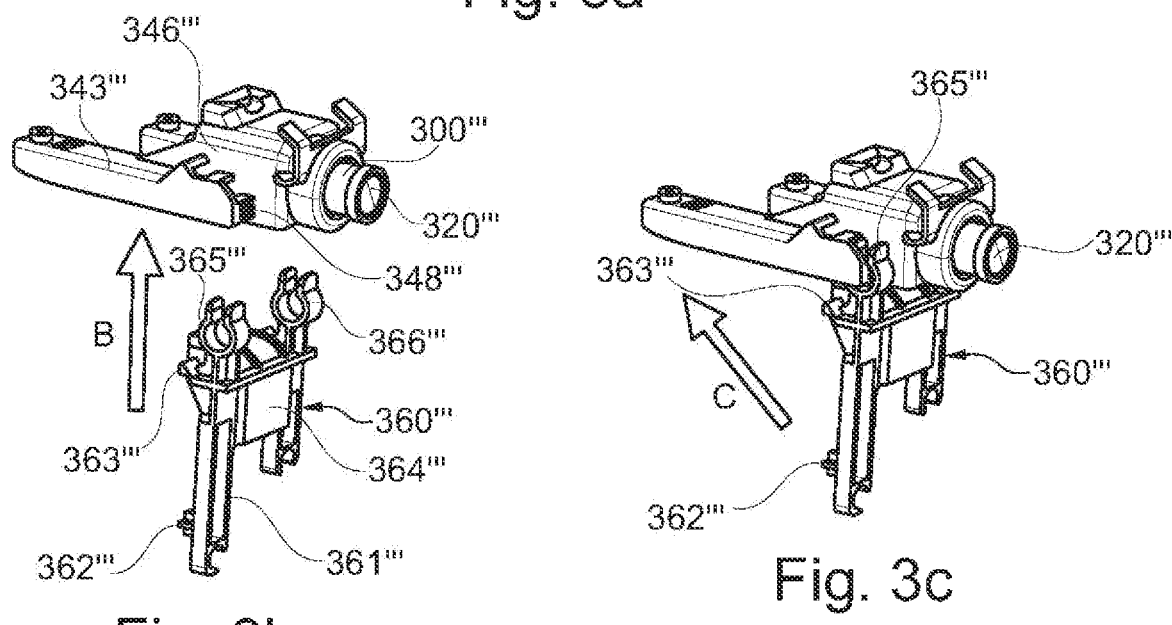
Fig. 3b
Fig. 3c
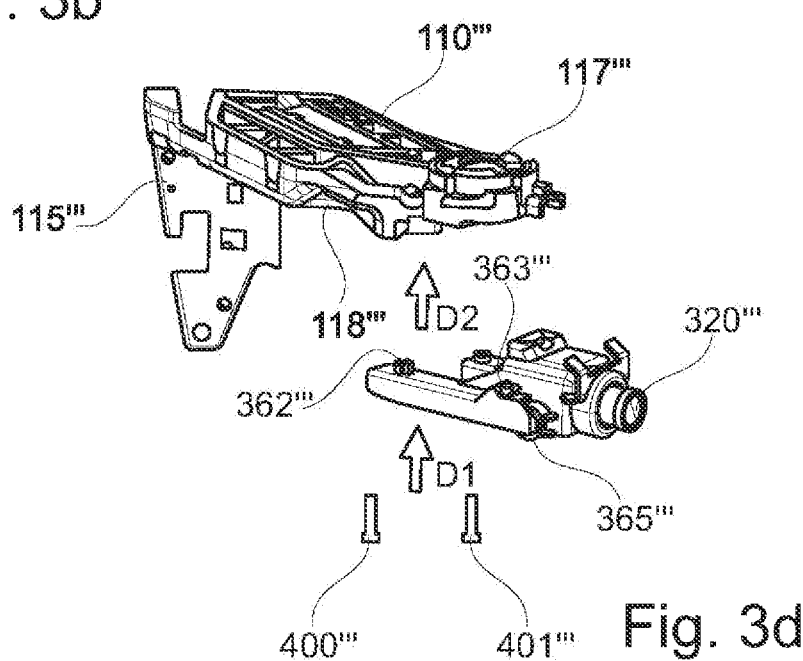
Fig. 3d

BASE ASSEMBLY, REAR VIEW DEVICE CARRYING A CAMERA, VEHICLE AND ASSEMBLING METHOD

CROSS-REFERENCE TO RELATED APPLICATIONS

This application claims priority to German Patent Application No. DE 10 2022 106 903.6, filed on Mar. 23, 2022, which is incorporated herein by reference in its entirety.

FIELD

The present disclosure refers to a base assembly of an exterior rear view device to be mounted to a vehicle, the base assembly comprising a base frame and at least one camera sub-assembly attached to the base frame. It also refers to a rear view device with such a base assembly, a vehicle with such a rear view device and a method for assembling such a base assembly.

BACKGROUND

A rear view device typically includes a base assembly to be attached to a vehicle and a head assembly mounted to the base assembly and being moveable relative to the base assembly. Generally the head assembly of a rear view device can be rotated between a driving position and a parking position.

The term "rear view" may refer to a view of the surrounding area, which is not in the field of view of a driver of a vehicle, i.e. the directions opposing, left, right, below and above of the viewing direction, but can also comprise the view in the direction of the viewing direction of the driver and/or any combinations of the directions. The rear view can be achieved via at least one rear view element in form of a reflective element like a mirror and/or an image acquisition means like a camera. The rear view, that is the field of view of the driver, can be adjusted by moving, in particular rotating, the reflective element and/or the image acquisition means.

The base assembly in general comprises a base frame which fulfills a multitude of functions, in particular that of supporting the head assembly and connecting the same as well as electronic components of the exterior rear view device to the vehicle and a central control unit within the vehicle. A camera is one of such electronic components, and it is common to attach such a camera via a camera cradle.

Further, the base frame is covered by one or more pieces to achieve a pleasing appearance and to adapt the exterior rear view device to the vehicle design. But the cover pieces also have to fulfill technical functions, like water drainage and the like.

SUMMARY

It is an object of the present disclosure to further develop the known base assembly such that a camera can easily and simultaneously reliably be mounted.

This object may be achieved in that the camera sub-assembly comprises at least one camera, a camera cradle and a camera holder designed to provide clamping force and datum onto the camera.

According to an embodiment the camera is loaded into the camera cradle, wherein preferably the camera extends at least partly through a housing portion of the camera cradle, and/or the camera is clamped within the housing portion of the camera cradle, and/or a lens extends beyond an opening of the camera cradle such that the camera can obtain images through the opening.

According to another embodiment the camera cradle is clamped to the base frame, in particular both directly and via the camera holder, wherein preferably the camera cradle comprises at least one extension and/or protrusion designed to be inserted and/or clamped into a complementary recess of the base frame, and/or the camera cradle comprises at least one clips designed to be inserted and/or clamped into a complementary part of the base frame, and/or the camera cradle comprises at least one opening designed for a protrusion of the camera holder to pass through, and/or the camera cradle comprises at least one contact surface designed to be engaged by a clip of the camera holder.

In this respect it is also proposed that a first camera cradle opening extends through the camera cradle protrusion, preferably arranged in an arm extending from the camera cradle housing portion at the end opposite the opening beyond which the lens extends, and/or a second camera cradle opening is arranged in the region of the camera cradle housing portion, and/or there are two camera cradle contact surfaces, preferably arranged on two opposite lateral sides of the camera cradle housing portion, and/or the camera cradle extension is arranged in the camera cradle housing portion, and/or there are two camera cradle protrusions, preferably one arranged in the camera cradle housing portion and another in the arm extending therefrom.

It may also be that the camera holder positioning within the camera sub-assembly is achieved by its clip(s), and the camera holder locking within the camera sub-assembly is achieved by its clip(s) and protrusion(s) via clamping force.

Further, an embodiment can be characterized in that the camera sub-assembly is clamped to the base frame, and the clamped camera sub-assembly is secured via at least one screw connection, wherein preferably a screw is passed through the protrusions and/or openings of the camera holder and the camera cradle.

It may also be that the base frame has a head attachment portion designed for attaching a head assembly of the rear view device and a camera attachment portion designed for attaching the camera sub-assembly, with the head attachment portion and the camera attachment portion being arranged at opposite sides of the base frame, preferably at an end portion opposite a door attachment portion of the base frame.

Still further embodiments can comprise cover pieces designed to releasably mantle a base frame by being attached via clip, snap and/or latch connections, wherein preferably the cover pieces comprise a lower base cover, a base cover cap and an upper base cover, and/or at least one of the cover pieces provides a camera opening, and/or at least one of the cover pieces is attached to the camera sub-assembly via a clip, snap and/or latch connection.

It may also be that a base assembly according to the present disclosure comprises a glare shield surrounding the lens of the camera, in particular the lens extending through the opening of the base cover cap, and providing an opening through which the camera can obtain images, wherein preferably the glare shield is configured to be releaseably attached to at least one of the cover pieces and/or the camera cradle and/or the camera holder via at least one the via clip, snap and/or latch connection.

The present disclosure also provides an exterior rear view device with a base assembly outlined above and a head assembly moveably attached to said bas assembly.

Still further, the present disclosure provides a vehicle with at least one such exterior rear view device.

According to this disclosure, the same also provides a method for assembling a base assembly of an exterior rear view device to be mounted to a vehicle, comprising the following steps: loading a camera into a camera cradle, in particular into a camera cradle housing portion, locating a camera holder onto the camera cradle, in particular via clip, snap and/or latch connection, especially via two clips of the camera holder engaging respective contact surfaces arranged at opposite sides of the housing portion, and rotating the camera holder into the camera cradle to clip into position and clamp the camera in place, such that the camera, the camera cradle and the camera holder form a camera sub-assembly.

In line with one embodiment the method may also comprise the following steps: clamping the camera sub-assembly to a base frame of the base assembly, and securing the clamping force applied to the camera within the camera sub-assembly and the clamping force acting between the camera sub-assembly and the base frame via a further connection, in particular a screw connection.

According to the present disclosure a camera holder is assembled onto a camera cradle loaded with a camera to provide clamping force and datum onto the camera. Said clamping force is maintained and even strengthened by assembling the camera sub-assembly of the camera, the camera cradle and the camera holder on a base frame of a rear view device base assembly via a clip, snap and/or latch connection and, if necessary, a screw connection.

The foregoing summary, as well as the following detailed description, will be better understood when read in conjunction with the appended drawings. For the purpose of illustration, certain examples of the present disclosure are shown in the drawings. It should be understood, however, that the present disclosure is not limited to the precise arrangements and instrumentalities shown. The accompanying drawings, together with the detailed description, serve to explain advantages and principles consistent with the present disclosure, wherein:

BRIEF DESCRIPTION OF THE DRAWINGS

FIGS. 3a-3d are perspective views demonstrating the attachment of a camera to a abase frame of the base assembly of FIG. 2.

DETAILED DESCRIPTION

Figure 1:
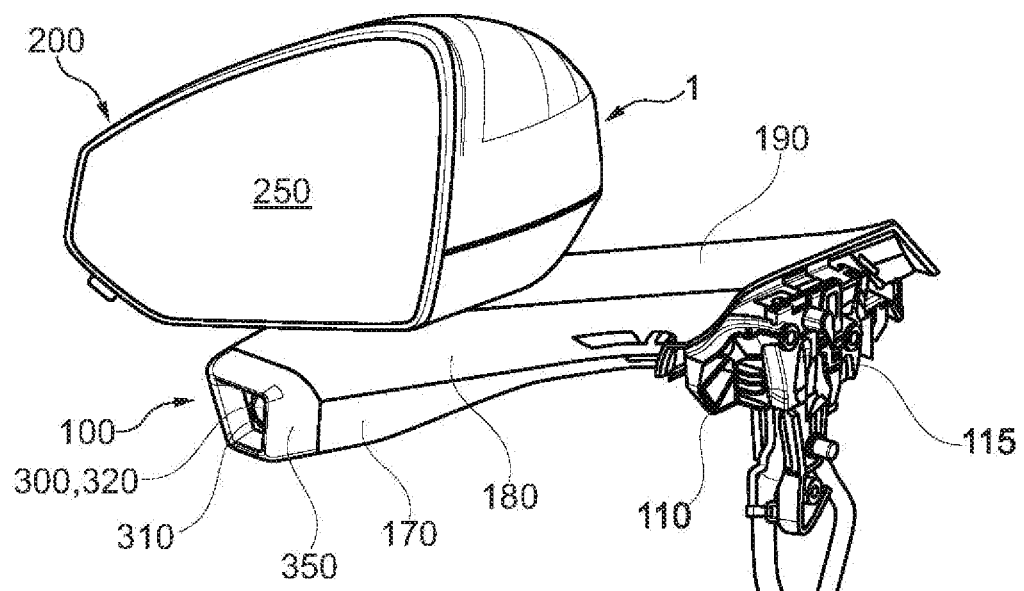
FIG. 1 is a perspective view of a first exterior rear view device of the present disclosure, with a head assembly for carrying a mirror and a base assembly for carrying the head assembly and at least one camera.

FIG. 1 depicts a first external rear view device 1 of the present disclosure. It comprises a base assembly 100 onto which a moveable head assembly 200 is attached at a head attachment portion. The base assembly 100 is configured to be mounted to a vehicle at a door attachment portion 115.

The head assembly 200 comprises a reflective element 250 in form of e.g. a mirror glass, and the base assembly 100 comprises a camera 300. The camera 300 is arranged in the base assembly 100 such that a lens 320 may obtain a rear view image through an opening 310 provided by the base assembly 100. The camera 300 is attached to a base frame 110, via a camera cradle as described with respect to FIGS. 3a to 3d, and the opening 310 may be provided by cover pieces of a base frame 110. Said cover pieces may comprise at least three pieces as described in detail in DE 10 2021 107 597.1 to which reference is made herewith. Said three pieces may comprise a base cover cap 180, a lower base cover 170 and an upper base cover 190, and they releaseably mantle the base frame 110 by being attached via clip, snap and/or latch connections.

Still further, the cover of the base frame 110 may comprise a glare shield 350. The glare shield 350 may be releaseably clipped to the base cover cap 180 as well as to the camera cradle.

Figure 2:
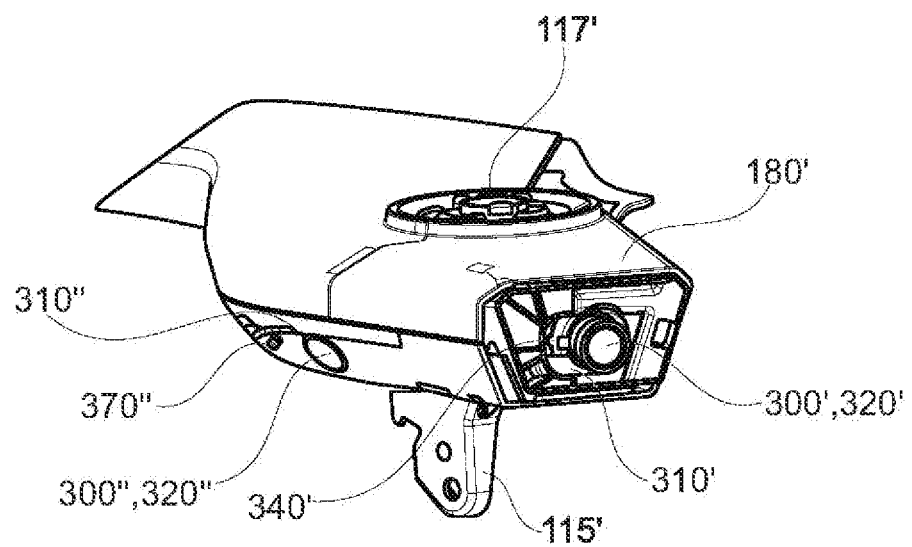
FIG. 2 is a perspective view of a base assembly of a second exterior rear view device of the present disclosure carrying two cameras.

FIG. 2 shows an alternative base assembling 100' of a second rear view device of the present disclosure which is equipped with two cameras 300', 300'', which may be arranged substantially perpendicular to each other and an axis of a head attachment portion 117'. A first camera 300' may extend through an opening 310' in a base cover cap 180' with its lens 320' as described with respect to FIG. 1. A glare shield as described above may be attached to the base cover cap 180' and a camera cradle 340'. A second camera 300'' may be arranged such that its lens 320'' extends through an opening 310'' in the lower base cover 170''. A cleaning system may be associated with the second camera 300''', which may comprise a nozzle 370'' attached to and/or extending through the lower base cover 170''. The cleaning system may be controlled by a control unit in dependency of the output of a sensor sensing contamination.

FIGS. 3a to 3d illustrate the attachment of a camera 303'''' to a base frame 110''' of a base assembly, by making usage of a two part design, namely in form of a camera cradle 340''' and a camera holder 360'''.

The camera cradle 340''' comprises at least one clip 341''' for the attachment to the base frame 110'''. Further, there is an opening 342''' at a first end of the camera cradle 340''', through which at least a lens 320''' of the camera 300''' can be pushed such that images can be obtained. The camera cradle 340''' further comprises an arm 343''' extending at a second and, opposite the first end with the viewing opening 342'''. Said arm 343''' is provided with a protrusion 344''' through which an opening extends to allow for attachment of the camera holder 360''' and to the base frame 110''' such that the camera cradle 340''' is sandwiched between the camera holder 360''' and the base frame 110'''. Still further, the camera cradle 340''' has a housing portion 346''' into which the camera 300''' may be loaded by moving the same along the arrow A as indicated in FIG. 3a.

There is a further projection 347''' provided by the camera cradle 340''', also serving to clamp the camera cradle 340''' holding the camera 300''' between the camera holder 360''' and the base frame 110''', as explained below. For providing further strength to said connection, the camera cradle 340''' has an extension 345'' to be inserted into a complementary recess of the base frame 110'''. Thus, the extension 345''', and the protrusions 344''', 347''' are provided for clamping into the base frame 110'''. In addition, the camera cradle 340''' is provided with two contact surfaces 348''' one on each side of the housing portion 346'''' for the attachment of the camera holder 360'''.

FIG. 3b shows the camera 300''' loaded into the camera cradle 340'''. By the arrow B a first attachment step of the camera holder 360'''' to the camera cradle 340''' is illustrated, namely by locating the camera holder 360'''' into the camera cradle 340''' as soon as two clips 365''' and 366''' of the camera holder 360''' engage the contact surfaces 348''' of the camera cradle 340''' as shown in FIG. 3c.

The camera holder 360''' is provided with an arm 361''' which is provided at its free end with a protrusion 362''' through which a pass through is provided to form an opening. Further, another protrusion 363''' in form of a tapered shoulder is provided, in the region of a supporting portion 364''' of the camera holder 360'''' strengthening the same.

As indicated by the arrow C in FIG. 3c the camera holder 360''' is to be rotated towards the camera cradle 340''' in a second attachment step such that the protrusions 362''' and 363''' enter respective openings of the camera cradle 340''' as shown in FIG. 3d. Thus, by rotating the camera holder 360''' into the camera cradle 340''' a clip connection is obtained which places the camera 300'''' in its final position of a camera sub-assembly comprising both, the camera cradle 340''' and the camera holder 360''' in addition to the camera 300'''.

As further indicated in FIG. 3d, said camera sub-assembly is attached to the bottom surface of the base frame 110''', that is at a camera attachment portion 118'', whereas the head attachment portion 117'' is on the upper side of the base frame 110'''. The attachment is achieved not only by the protrusions 362'' and 363''' being clamped to the base frame 110''', but this attachment is further secured by two screws 400''' and 401'' passing through the opening extending through the protrusion 362'' and a further opening and, thus, through both, the camera cradle 340''' and the camera holder 360'''. The two screws 400''', 401''' further clamp the camera sub-assembly to the base frame 110''' which will secure the clamping force to the camera 300''' within said camera sub-assembly.

As soon as the camera sub-assembly has been attached to the base frame 110''', a lower base cover, a base cover cap and an upper base cover can be attached to the base frame 110''' to obtain the base assembly shown in FIG. 2.

The attachment of the camera 300''' via the camera cradle 340''' as well as the camera holder 360'''' ensures a correct placement of the camera 300''' due to the positioning explained with respect to FIG. 3b and the locking explained with respect to FIG. 3c by simply rotating the camera holder 360''', with the clamping force between the camera holder 360'''', the camera cradle 340''' and the base frame 110''' being maintained via the screws 400''' and 401'''.

In summary, the camera holder 360''' provides clamping force and datum to the camera 300''', i.e. the body of the camera. This leads to a well-defined suspension of the camera 300''' within the base assembly.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE SIGNS 1 exterior rear view device
100, 100', 100'' base assembly
110, 110', 110'', 110''' base frame
115, 115', 115'', 115''' door attachment portion
117', 117'', 117''' head attachment portion
118' camera attachment portion
170, 170' lower base cover
180, 180' base cover cap
190, 190', 190'' upper base cover
200, 200' head assembly
250 reflective element
300, 300', 300'', 300''' camera
310, 310', 310'' opening
320, 320', 320'', 320''' lens
340', 340''' camera cradle
341''' clips
342''' opening
343''' arm
344''' protrusion
345''' extension
346''' housing portion
347''' protrusion
348''' contact surface
350 glare shield
360''' camera holder
361''' arm
362''' protrusion
363''' protrusion
364''' supporting portion
365''' clip
366''' clip
370'' cleaning nozzle
400''' screw
401''' screw

The invention claimed is:

1. A method for assembling a base assembly of an exterior rear view device to be mounted to a vehicle, comprising:
   installing a camera in a camera cradle housing portion of a camera cradle, placing a camera holder onto the camera cradle via at least one clip, snap, or latch connection,
   rotating the camera holder into the camera cradle to clip into position and clamp the camera in place, such that the camera, the camera cradle, and the camera holder form a camera sub-assembly.

2. The method of claim 1, wherein the camera extends at least partly through a housing portion of the camera cradle.

3. The method of claim 1, wherein the camera is clamped within a housing portion of the camera cradle.

4. The method of claim 1, wherein a lens extends beyond an opening of the camera cradle such that the camera can obtain images through the opening.

5. The method of claim 1, wherein the camera sub-assembly includes two camera cradle protrusions, wherein one camera cradle protrusion is disposed in a camera cradle housing portion and another camera cradle protrusion is in an arm extending therefrom.

6. The method of claim 1, wherein
   a position of the camera holder within the camera sub-assembly is achieved by one or more clip, and
   the camera holder is locked within the camera sub-assembly by the one or more clips and protrusions via clamping force.

7. The method of claim 1, wherein the camera sub-assembly is clamped to the base frame, and the clamped camera sub-assembly is secured via at least one screw connection.

8. The method of claim 7, wherein a screw is passed through protrusions and/or openings of the camera holder and the camera cradle.

9. The method of claim 1, wherein the camera sub-assembly includes a glare shield surrounding a lens of the camera, the lens extending through an opening of a base cover cap such that the camera can obtain images.

10. The method of claim 9, wherein the glare shield is configured to be releaseably attached to at least one of one or more cover pieces, the camera cradle, or the camera holder via at least one clip, snap, or latch connection.

11. The method of claim 1, wherein the camera holder is placed onto the camera cradle via two clips of the camera holder engaging respective contact surfaces arranged at opposite sides of the cameral cradle housing.

12. The method of claim 11, further comprising:
clamping the camera sub-assembly to a base frame of the base assembly, and
securing a clamping force applied to the camera within the camera sub-assembly and the clamping force acting between the camera sub-assembly and the base frame via a further screw connection.

13. The method of claim 12, wherein the camera cradle is clamped to the base frame both directly and via the camera holder.

14. The method of claim 13, wherein the camera cradle comprises an extension and/or a protrusion configured designed to be inserted and/or clamped into a complementary recess of the base frame.

15. The method of claim 14, wherein the camera cradle extension is arranged in the camera cradle housing.

16. The method of claim 13, wherein the camera cradle comprises a clip configured to be inserted and/or clamped into a complementary part of the base frame.

17. The method of claim 13, wherein the camera cradle comprises an opening configured for a protrusion of the camera holder to pass through.

18. The method of claim 13, wherein the camera cradle comprises a contact surface configured to be engaged by a clip of the camera holder.

19. The method of claim 13, wherein a first camera cradle opening extends through a camera cradle protrusion.

20. The method of claim 19, wherein the camera cradle protrusion is included in an arm extending from a portion of the camera cradle housing at an end opposite the first camera cradle opening beyond which a lens extends.

21. The method of claim 20 wherein a second camera cradle opening is arranged in a region of the camera cradle housing portion.

22. The method of claim 20, wherein there are two camera cradle contact surfaces arranged on two opposite lateral sides of the camera cradle housing portion.

23. The method of claim 12,
wherein the base frame includes a head attachment portion configured to attach a head assembly of the exterior rear view device and a camera attachment portion configured to attach the camera sub-assembly, and
wherein the head attachment portion and the camera attachment portion are disposed at opposite sides of the base frame.

24. The method of claim 23, wherein the head attachment portion and the camera attachment portion are disposed at an end portion opposite a door attachment portion of the base frame.

25. The method of claim 12, further comprising:
attaching a plurality of cover pieces to releasably mantle the base frame via one or more clip, snap, or latch connection.

26. The method of claim 25, wherein the plurality of cover pieces include a lower base cover, a base cover cap, and an upper base cover.

27. The method of claim 25, wherein at least one of the plurality of cover pieces provides a camera opening.

28. The method of claim 25, wherein at least one of the plurality of cover pieces is attached to the camera sub-assembly via one or more clip, snap, or latch connection.

29. The method of claim 12, further comprising
moveably attaching a head assembly to the base assembly.

* * * * *